(12) United States Patent
Park et al.

(10) Patent No.: US 8,247,736 B2
(45) Date of Patent: Aug. 21, 2012

(54) APPARATUS FOR FORMING PATTERN ON LIGHT GUIDE PANEL

(75) Inventors: Deukil Park, Pyeongtaek-si (KR);
Choongyop Rhew, Pyeongtaek-si (KR);
Daisoung Park, Pyeongtaek-si (KR);
Wonmyeong Kang, Pyeongtaek-si (KR)

(73) Assignee: LS Tech Co., Ltd., Pyeongtaek-Si, Gyeonggi-Do (KR)

( * ) Notice: Subject to any disclaimer, the term of this patent is extended or adjusted under 35 U.S.C. 154(b) by 242 days.

(21) Appl. No.: 12/834,405

(22) Filed: Jul. 12, 2010

(65) Prior Publication Data

US 2011/0062125 A1    Mar. 17, 2011

(30) Foreign Application Priority Data

Sep. 11, 2009  (KR) .................. 10-2009-0085799

(51) Int. Cl.
*B23K 26/08* (2006.01)
*B23K 26/00* (2006.01)

(52) U.S. Cl. .................................. 219/121.8

(58) Field of Classification Search ............. 219/121.62, 219/121.66, 121.8, 121.81, 121.85; 291/121.69; 264/400, 482, 40.1; 425/174.4; 362/623, 362/330

See application file for complete search history.

(56) References Cited

U.S. PATENT DOCUMENTS 5,779,338 A * 7/1998 Ishikawa et al. ............. 362/625
6,548,009 B1 * 4/2003 Khlif et al. .................. 264/400
8,122,846 B2 * 2/2012 Stiblert et al. ............... 118/300

FOREIGN PATENT DOCUMENTS

| KR | 10-1998-0008596 | 9/1998 |
| KR | 10-2000-0075525 | 3/2001 |
| KR | 10-2002-0028919 | 8/2002 |
| KR | 10-2001-0025870 | 11/2002 |
| KR | 20-2003-0016501 | 8/2003 |
| KR | 10-2002-0026023 | 11/2003 |
| KR | 10-2004-0029372 | 6/2004 |
| KR | 10-2005-0010952 | 5/2006 |
| KR | 10-2005-0057719 | 5/2006 |
| KR | 10-2005-0012612 | 8/2006 |
| KR | 10-2006-0049742 | 12/2007 |
| KR | 10-2007-0079064 | 11/2008 |

* cited by examiner

*Primary Examiner* — Dao H Nguyen
*Assistant Examiner* — Tram H Nguyen
(74) *Attorney, Agent, or Firm* — IPLA P.A.; James E. Bame (57) ABSTRACT

An apparatus for forming a pattern is provided. The apparatus includes a pattern storing unit, a controller, a laser oscillating unit, an X-Y driver, a header unit, and a stage. The pattern storing unit stores data on a light guide pattern. The controller reads out the data on the light guide pattern, and transmits a position signal of each light guide pattern to the X-Y driver and simultaneously, transmits a switching signal to the laser oscillating unit. The laser oscillating unit outputs a laser beam synchronized with a movement of a header unit. The X-Y driver moves the header unit and the stage. The header unit moves along a fixed first guide rail in the left and right direction of the light guide panel. The stage moves along a fixed second guide rail in the front and rear direction of the light guide panel.

18 Claims, 8 Drawing Sheets

APPARATUS FOR FORMING PATTERN ON LIGHT GUIDE PANEL

CROSS REFERENCE

This application claims foreign priority under Paris Convention and 35 U.S.C. §119 to Korean Patent Application No. 10-2009-0085799, filed Sep. 11, 2009 with the Korean Intellectual Property Office.

BACKGROUND OF THE INVENTION

1. Technical Field

The present invention relates to a pattern forming apparatus used in a light guide panel for backlight of a liquid crystal display device, a keypad, a telephone, a lighting surface light source, etc. More particularly, the present invention relates to a pattern forming apparatus for forming a light guide pattern, by splitting a laser beam into several beams to generate a plurality of concentrated laser beams and scanning with the laser beams using a stage movable front and rear, a movement unit movable left and right, and a header unit coupled to the movement unit.

2. Description of the Related Art

Commonly, a light guide panel, which is a plate for providing a path for uniformly scattering and diffusing light scanned from a light source, is being applied to a light receiving flat display device such as a liquid crystal display device, or a surface light source device used in a lighting signboard, etc.

Figure 1:
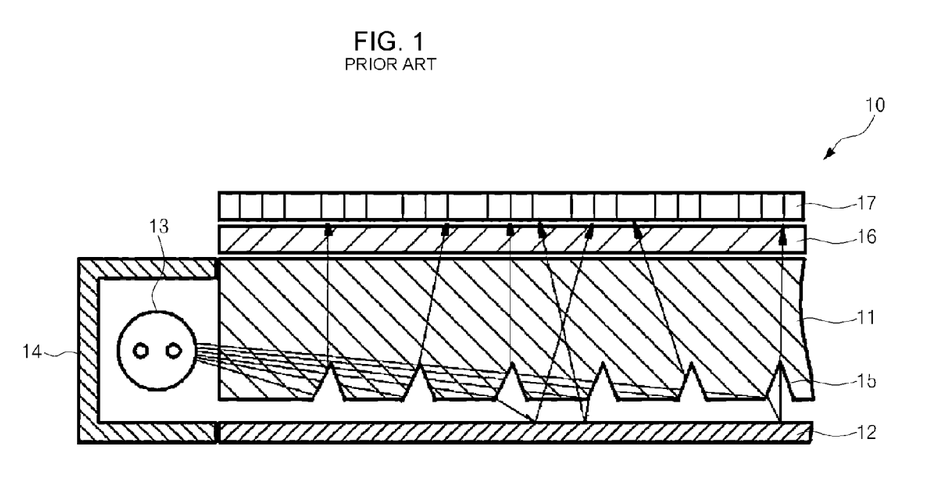
FIG. 1 is a diagram illustrating a conventional surface light source device.

FIG. 1 is a cross section schematically illustrating a conventional surface light source device.

Referring to FIG. 1, the conventional surface light source device 10 includes a light guide panel 11, a reflective sheet 12 installed below the light guide panel 11, a light source 13 installed at one side of the light guide panel 11, and a cover member 14 covering the light source 13. As the light source 13, a cold cathode fluorescent lamp, a Light Emitting Diode (LED), etc. can be used. In the light guide panel 11, a plurality of light guide patterns 15 are formed by using a bead-shaped Oxide Titanium ($TiO_2$) and ink including glass, acryl, etc. to scatter and diffuse light incident on one surface of a transparent acrylic resin. In the surface light source device 10, light irradiated from the light source 13 is incident on the light guide panel 11, and the incidence light is guided through the light guide panel 11 as indicated by arrows. After that, the guided light is reflected at relatively uniform illumination in each part by the reflective sheet 12 and the light guide patterns 15. After that, the reflected light passes through a diffuse sheet 16 and again passes through a prism sheet 17 to direct toward the front.

However, the light guide patterns 15 formed in a printing method have the following problems.

A process of manufacturing and printing an ink for forming light guide patterns is very complex, and an error rate of omitting or staining a part of a printed part, etc. is high. Due to this, a throughput for the light guide pattern is low to the extent of about 80% to 90%. Also, there is a disadvantage that the light guide panel based on the printing method is not environment-friendly because recycling is difficult.

Particularly, the light guide patterns 15 are based on a method using a light reflection of a print ink itself, so a light absorption phenomenon of the ink itself occurs necessarily. This light absorption phenomenon results in a decrease of a light efficiency of a surface light source device.

As a solution to the above problem, a non-printing method is applied. The non-printing method can be an injection molding method using a mold.

The aforementioned method has to repeat a mold revision work more than a few dozens of times. Thus, there is a disadvantage of increasing a development cost. Also, as a period of time of mold manufacturing is lengthened, it is difficult to meet a suddenly changing requirement for development of a product model. Also, there is a problem that, in case that a product gets thick, this causes an increase of a period of time of cooling after injection to a few minutes or so, thus decreasing productivity. Inversely, in case that a product gets very thin and gets wide in area, an error of pattern non-formation, etc. takes place because of imperfect injection.

A solution to the above problems is a method of processing a light guide pattern using a laser. The use of the laser makes a constant treatment to a desired dimension possible with no influence from a deviation of a thickness of material, and makes a supplementary device such as a mold, a mask, etc. unnecessary. Also, the pattern is recyclable and environment-friendly because they are not coated with separate materials. However, because the conventional method has to form all the patterns one by one through a laser treatment, there is a problem that a period of time of treatment greatly increases and thus, productivity decreases.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide an apparatus for forming a pattern, for improving the productivity of a light guide pattern.

Another aspect of exemplary embodiments of the present invention is to provide an apparatus for forming a pattern, for generating a plurality of light guide patterns at a time and simultaneously, controlling a length of the light guide pattern by line.

According to one aspect of the present invention, an apparatus for forming a pattern is provided. The apparatus includes a pattern storing unit, a controller, a laser oscillating unit, an X-Y driver, a header unit, and a stage. The pattern storing unit stores data on a light guide pattern to be formed in a light guide panel. The controller reads out the data on the light guide pattern stored in the pattern storing unit, and transmits a position signal of each light guide pattern to be formed in the light guide panel to the X-Y driver and simultaneously, transmits a switching signal, which is generated on the basis of length information of the light guide pattern, to the laser oscillating unit. The laser oscillating unit outputs a laser beam synchronized with a movement of a header unit, on the basis of the position signal received from the controller. The X-Y driver moves the header unit and the stage, on the basis of the position signal received from the controller. The header unit moves along a fixed first guide rail in the left and right direction of the light guide panel by way of the X-Y driver, and forms the light guide pattern in the light guide panel by vertically downwardly reflecting and concentrating the laser beam output from the laser oscillating unit. The stage moves along a fixed second guide rail in the front and rear direction of the light guide panel by way of the X-Y driver, and safely mounts the light guide panel thereon. The header unit includes a beam splitter for splitting the laser beam being output from the laser oscillating unit up two or more laser beams, and an optic unit for reflecting and concentrating each of the two or more laser beams split in the beam splitter. The two or more laser beams simultaneously output from the optic unit are each concentrated to a multi focus at a distance on the whole processing surface of the light guide panel.

According to another aspect of the present invention, an apparatus for forming a pattern is provided. The apparatus includes a pattern storing unit, a controller, a plurality of laser oscillating units, an X-Y driver, a header unit, and a stage. The pattern storing unit stores data on a light guide pattern to be formed in a light guide panel. The controller reads out the data on the light guide pattern stored in the pattern storing unit, and transmits a position signal of each light guide pattern to be formed in the light guide panel to the X-Y driver and simultaneously, transmits a plurality of switching signals, which are generated on the basis of length information of the light guide pattern. The plurality of laser oscillating units are each independently controlled on the basis of the plurality of switching signals received from the controller, and output a laser beam synchronized with a movement of the header unit. The X-Y driver moves the header unit and the stage, on the basis of the position signal received from the controller. The header unit moves along a fixed first guide rail in the left and right direction of the light guide panel by way of the X-Y driver, and forms the light guide pattern in the light guide panel by vertically downwardly reflecting and concentrating each of the laser beams output from the plurality of laser oscillating units. The stage moves along a fixed second guide rail in the front and rear direction of the light guide panel by way of the X-Y driver, and safely mounts the light guide panel thereon. The plurality of laser beams simultaneously output from the laser oscillating unit are each concentrated to a multi focus at a distance on the whole processing surface of the light guide panel.

The light guide pattern formed in the light guide panel is comprised of grooves of a dot pair or group comprised of two or more dots, a dotted line pair or group comprised of two or more dotted lines, or a straight line pair or group comprised of two or more straight lines.

The apparatus further includes a vacuum unit installed on a bottom surface of the light guide panel in order to prevent the light guide panel from being bent due to local heating of the laser beam.

The apparatus further includes an exhaust unit installed on a top surface of the light guide panel in order to eliminate smoke generated while the light guide pattern is formed in the light guide panel.

The light guide pattern is formed such that a length (L3) of each groove of the light guide pattern gradually gets longer as it is distant from a light source.

The light guide pattern is formed such that a pitch (P) of each groove of the light guide pattern gradually gets narrower as it is distant from a light source.

The light guide pattern is formed throughout the light guide panel such that an interval (L1) between grooves is identical with an interval (L2) between groove pairs, or only the intervals (L1) between the grooves are identical with each other, or only the intervals (L2) between the groove pairs are identical with each other.

The light guide pattern is formed such that one groove pair and a groove pair of a next line are alternated.

The light guide pattern is formed such that a plurality of lines each comprised of groove pairs are arranged horizontally with the arrangement direction of a light source, and a region of groove pairs of one line is partially overlapped with a region of groove pairs of a next line.

BRIEF DESCRIPTION OF THE DRAWINGS

The above and other objects, features and advantages of the present invention will become more apparent from the following detailed description when taken in conjunction with the accompanying drawings in which.

Throughout the drawings, the same drawing reference numerals will be understood to refer to the same elements, features and structures.

DESCRIPTION OF SPECIFIC EMBODIMENTS

Exemplary embodiments of the present invention will now be described in detail with reference to the annexed drawings. In the following description, a detailed description of known functions and configurations incorporated herein has been omitted for conciseness.

The following description is made with reference to the accompanying drawings.

Figure 2:
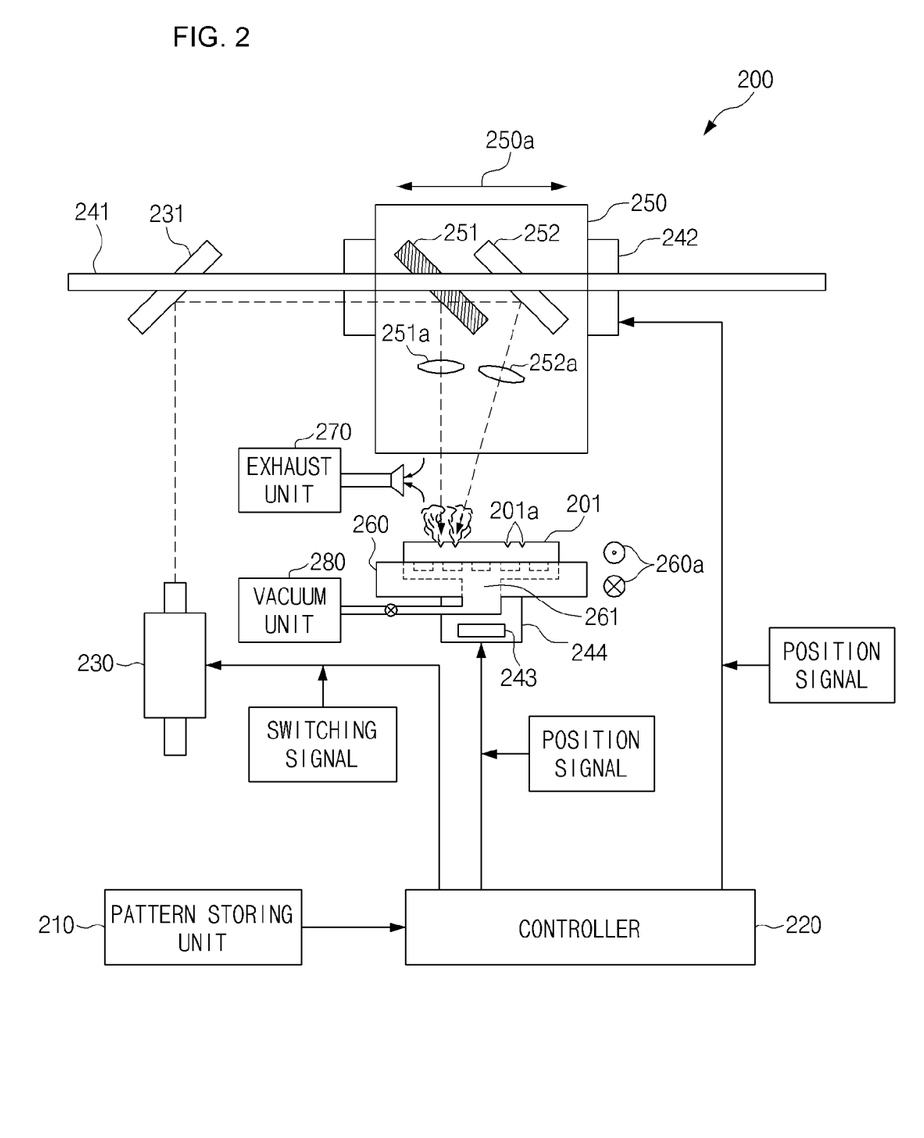
FIG. 2 is a diagram illustrating the whole construction of a pattern forming apparatus with a beam splitter according to a first exemplary embodiment of the present invention.
Figure 3:
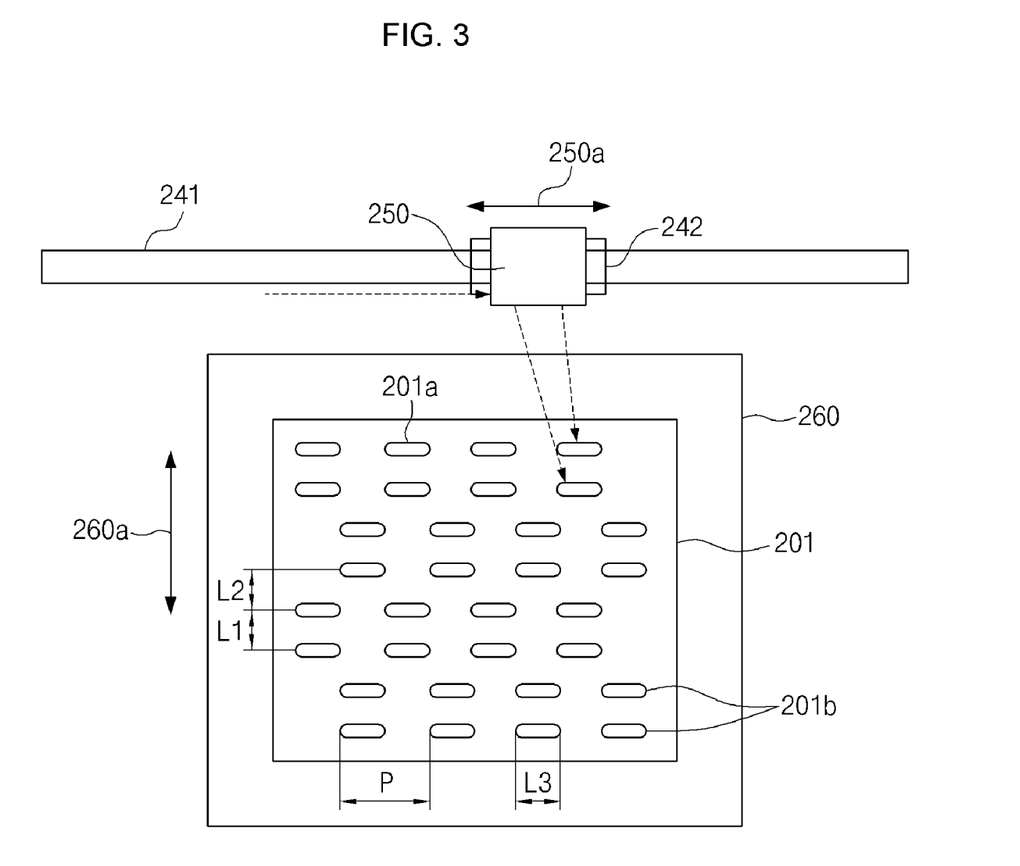
FIG. 3 is a diagram illustrating a light guide pattern light concentrated to a plurality of focuses at a predetermined distance by the pattern forming apparatus of FIG. 2.

FIG. 2 is a diagram illustrating the whole construction of a pattern forming apparatus with a beam splitter according to a first exemplary embodiment of the present invention. FIG. 3 is a diagram illustrating a light guide pattern light concentrated to a plurality of focuses at a predetermined distance by the pattern forming apparatus of FIG. 2. The pattern forming apparatus according to the present invention includes a pattern storing unit 210, a controller 220, a laser oscillating unit 230, an X driver (i.e., a first driver) 242, a Y driver (i.e., a second driver) 244, a header unit 250, a stage 260, an exhaust unit 270, and a vacuum unit 280.

Referring to FIGS. 2 and 3, the pattern storing unit 210 stores data on a light guide pattern 201a of a discontinuous straight line shape to be formed in a light guide panel 201. In detail, the data on the light guide pattern 201a can include position signal (i.e., X and Y coordinates) and length information on each light guide pattern 201a.

The controller 220 transmits a position signal of each light guide pattern 201a read out from the pattern storing unit 210, specifically, a position signal including an X coordinate of each light guide pattern 201a to the first driver 242, and transmits a position signal including a Y coordinate of each light guide pattern 201a to the second driver 244. Also, the controller 220 generates a switching signal for oscillating the laser oscillating unit 230 on the basis of the length information of the light guide pattern 201a read out from the pattern storing unit 210, and transmits the generated switching signal to the laser oscillating unit 230.

The laser oscillating unit 230 outputs a laser beam synchronized with a movement of the header unit 250, on the basis of the switching signal received from the controller 220.

The X-Y drivers 242 and 244 can include the first driver 242 for moving the header unit 250 in horizontal direction 250a along a first guide rail 241, and the second driver 244 for moving the stage 260 in front and rear direction 260a along a second guide rail 243. The first and second drivers 242 and 244 can be realized by a linear motor, for example, but they are realizable in various ways such as other belt and pulley driving ways, etc.

The header unit 250 includes a beam splitter 251, a reflection mirror 252, and lenses 251a and 252a. The beam splitter 251 splits a laser beam reflected by a first mirror 231 according to the present invention, into two or more laser beams. The reflection mirror 252 reflects the laser beam split by the beam splitter. The lenses 251a and 252a concentrate the laser beams reflected by the beam splitter 251 and reflection mirror 252 into a surface of the light guide panel 201, thus forming the light guide pattern 201a. Also, the header unit 250 is constructed to move in the left and right direction of the light guide panel 201 along the first guide rail 241 in combination with the first driver 242.

The stage 260 moves along the fixed second guide rail 243 in the front and rear direction 260a of the light guide panel 201 in combination with the second driver 244, and fixes the light guide panel 201 thereon.

The exhaust unit 270 removes smoke generated while the light guide pattern 201a is formed in the light guide panel 201. In detail, because an etching method based on laser beam scanning is a method of heating, with high energy, a surface of the light guide panel 201 of acrylic resin, smoke is generated due to a vaporized acrylic resin material. This smoke results in a phenomenon of absorption or scattering of a laser beam during a scanning process of forming the light guide pattern 201a in the light guide panel 201. This results in a decrease of energy of the laser beam scanning the light guide panel 201, thus interrupting a desired treatment for the light guide pattern 201a. In order to eliminate this phenomenon, the exhaust unit 270 is installed in the light guide panel 201. The exhaust unit 270 can prevent a phenomenon of absorbing or scattering of a laser beam due to smoke, by absorbing and discharging smoke of acrylic resin (i.e., the original material of the light guide panel 201) vaporized from a scanned surface of the light guide panel 201.

The vacuum unit 280 is a deformation prevention means for preventing the light guide panel 201 from being bent because of local heating of a laser beam. That is, if a laser beam locally scans a part of a surface of the light guide panel 201, a heating reaction on the scanned surface gradually increases more than a width of the laser beam. In case that the heating reaction is intensified, the light guide panel 201 is deformed. This deformation seriously takes place in the periphery of the light guide panel 201. Resultantly, an incident angle of the laser beam changes, thus making it difficult to form a delicate pattern. In order to prevent this, a bending prevention means is installed for the light guide panel 201. In detail, a vacuum path 261 is prepared inside the stage 260 safely mounting the light guide panel 210 thereon such that the vacuum path 261 can fully absorb one surface of the light guide panel 201 opposite to the other surface of the light guide panel 201 in which the light guide pattern 201a is formed, and the vacuum unit 280 for maintaining a vacuum state is prepared.

The vacuum path 261 is plurally installed in the vacuum unit 280 to vacuum absorb the light guide panel 210 through the inside of the stage 260. The vacuum unit 280 is a pump system such as a mechanical vacuum pump, a momentum transfer type vacuum pump, or a flow type vacuum pump. The vacuum unit 280 can vacuum absorb a bottom surface of the light guide panel 210 through the vacuum path 261 by means of pumping force. In such a state where the light guide panel 210 is fixed by the deformation prevention means, a laser beam scans and thus, can form the light guide pattern 201a. Accordingly, the bending phenomenon resulting from the local heating of the laser beam can be prevented in advance.

A process of forming the light guide pattern using the above-constructed pattern forming apparatus 200 is described below in detail.

Referring to FIGS. 2 and 3, the controller 220 reads out a position signal of the light guide pattern 201a to be formed in the light guide panel 201 (i.e., both a position signal including an X coordinate of each light guide pattern 201a and a position signal including a Y coordinate of each light guide pattern 201a) from the pattern storing unit 210, and transmits the read-out position signals to the first and second drivers 242 and 244, respectively. Also, the controller 220 generates a switching signal for oscillating the laser oscillating unit 230 on the basis of length information of the light guide pattern 201a read out from the pattern storing unit 210, and transmits the generated switching signal to the laser oscillating unit 230.

After that, on the basis of the switching signal received from the controller 220, the laser oscillating unit 230 outputs a laser beam synchronized with a movement of the header unit 250. The output laser beam is reflected from the first mirror 231 coupled with the first guide rail 241 and is incident on the header unit 250. On the other hand, the beam splitter 251 within the header unit 250 splits an incident laser beam into two laser beams of lower intensities. One of the two split laser beams is reflected by the reflection mirror 252 and then concentrated by the lens 252a, and the other one is directly concentrated by the lens 251a, thus forming the light guide pattern 201a in the surface of the light guide panel 201. At this time, in case that the beam splitter 251 is one in number, the laser beam can be split into two. In case that the beam splitter 251 is two or more in number, the laser beam can be split into three or more.

By the position signal from the controller 220, the header unit 250 is movable in the left and right direction 250a of the light guide panel 201 along the first guide rail 241. Accordingly, as illustrated in FIG. 3, when the header unit 250 moves along the first guide rail 241, the light guide pattern 201a is formed with two grooves being paired, thus being capable of improving the productivity of the light guide panel 201. After that, depending on the position signal from the controller 220, the stage 260 moves in front and rear direction 260a, and forms a light guide pattern 201a for a next line in the same way. In this way, the light guide pattern 201a is repeatedly formed and thus, the whole light guide pattern 201a can be formed. Each reference numeral of FIG. 3 is described later in detail with reference to FIGS. 5 to 8.

Figure 4:
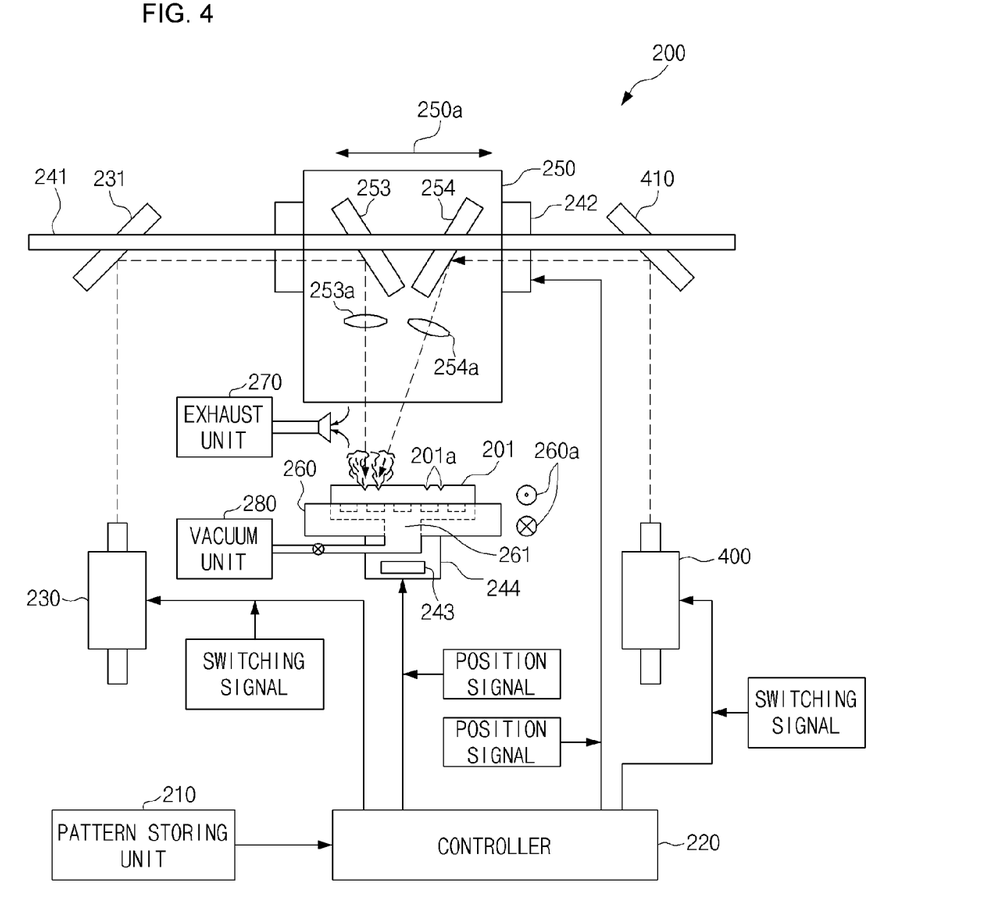
FIG. 4 is a diagram illustrating the whole construction of a pattern forming apparatus with a plurality of laser oscillating units according to a second exemplary embodiment of the present invention.

FIG. 4 is a diagram illustrating the whole construction of a pattern forming apparatus with a plurality of laser oscillating units according to a second exemplary embodiment of the present invention. Unlike the pattern forming apparatus of FIG. 2 using one laser oscillating unit, the pattern forming apparatus of FIG. 4 uses a plurality of laser oscillating units.

Referring to FIG. 4, a first laser beam output from a first laser oscillating unit 230 is concentrated to a surface of a light guide panel 201 by means of a first reflection mirror 231, and a reflection mirror 253 and lens 253a within a header unit 250. At the same time, a second laser beam output from a second laser oscillating unit 400 is concentrated to a surface of the light guide panel 201 by means of a second reflection mirror 410 and a reflection mirror 254 and lens 254a within the header unit 250. An operation principle of FIG. 4 is the same as described in association with FIGS. 2 and 3 except for the beam splitter 251.

According to the present invention, the laser oscillating units 230 and 400 are two in number, and the controller 220 can independently control each of the laser oscillating units 230 and 400. Thus, a groove pair 201b consisting of two grooves is formed in the light guide panel 201 but each groove constituting the groove pair 201b can be formed to have a completely different length and shape depending on a switching signal from the controller 220. Also, although there is a failure in any one laser oscillating unit 230, it is undoubted that a light guide pattern 201a can be formed using the other laser oscillating unit 400. By using a plurality of laser oscillating units as above, the present invention can advantageously create a plurality of light guide patterns at a time and simultaneously control lengths of the light guide patterns by line.

Figure 5:
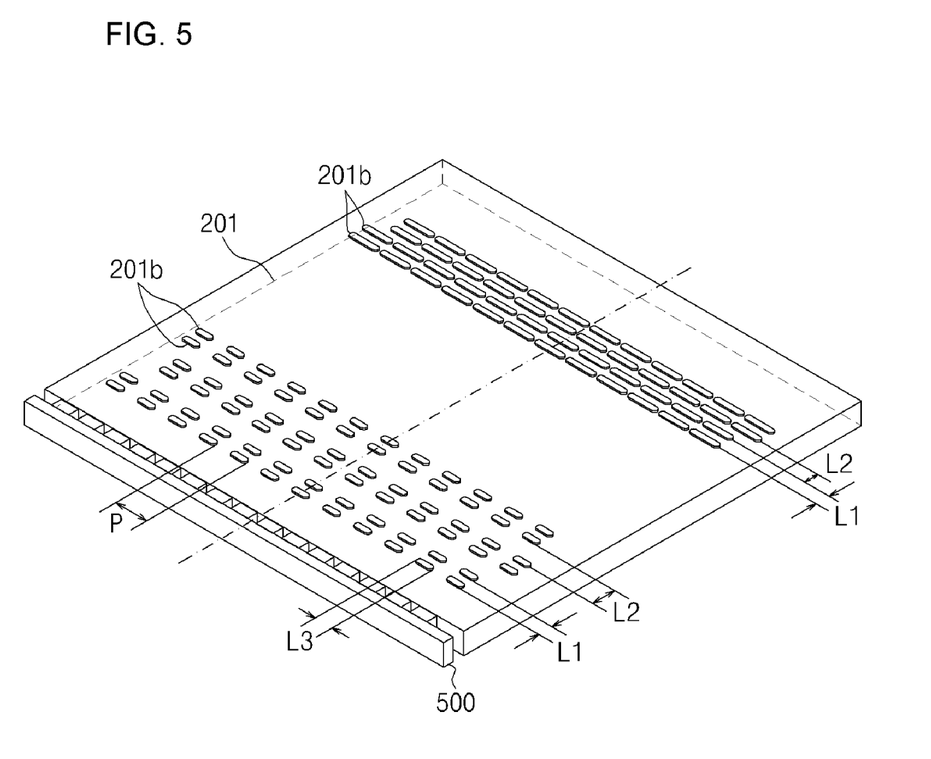
FIG. 5 is a perspective diagram illustrating a light guide panel and a light guide pattern formed therein according to an exemplary embodiment of the present invention.
Figure 6:
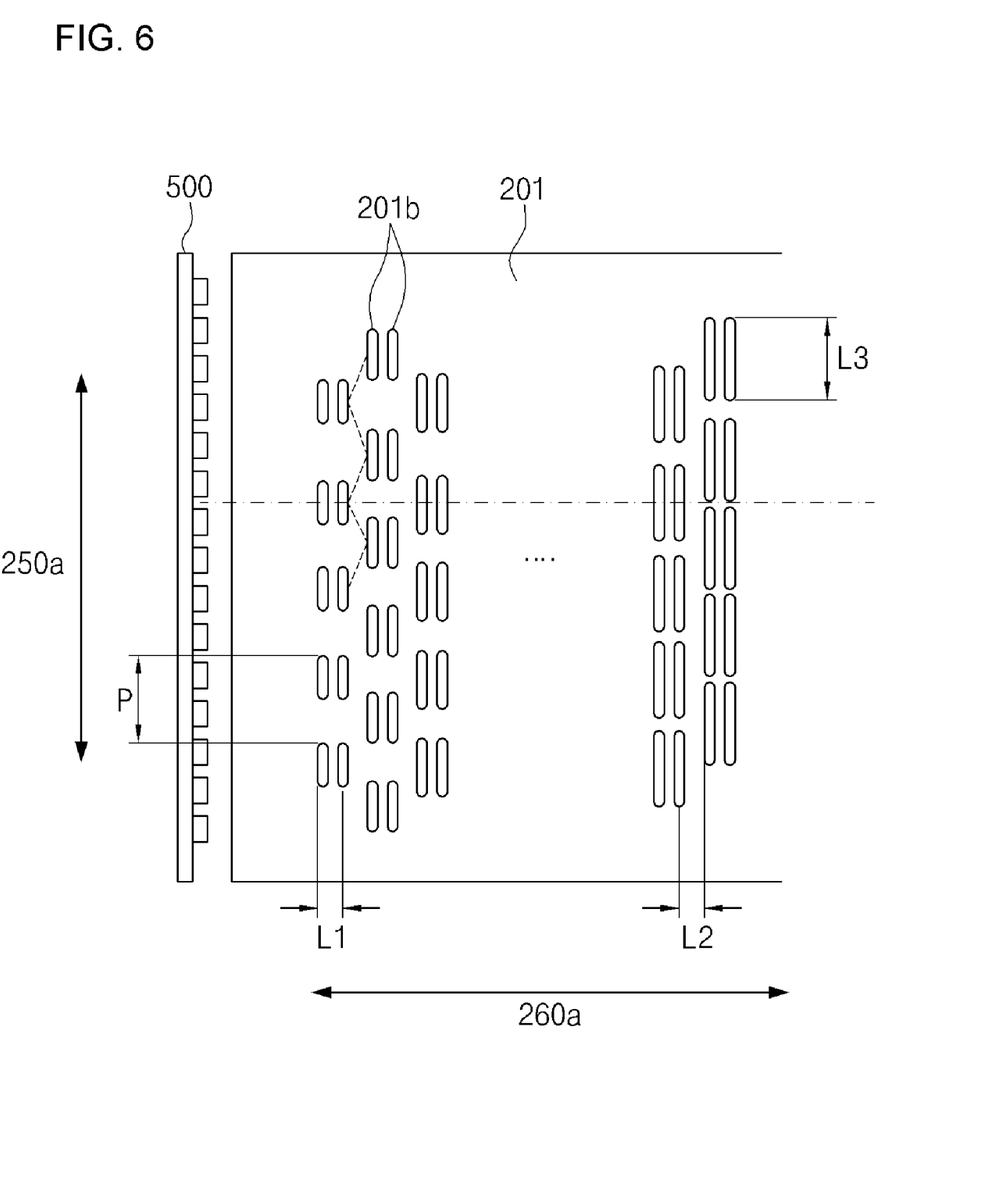
FIG. 6 is a diagram illustrating a shape of a light guide pattern according to an exemplary embodiment of the present invention.
Figure 7:
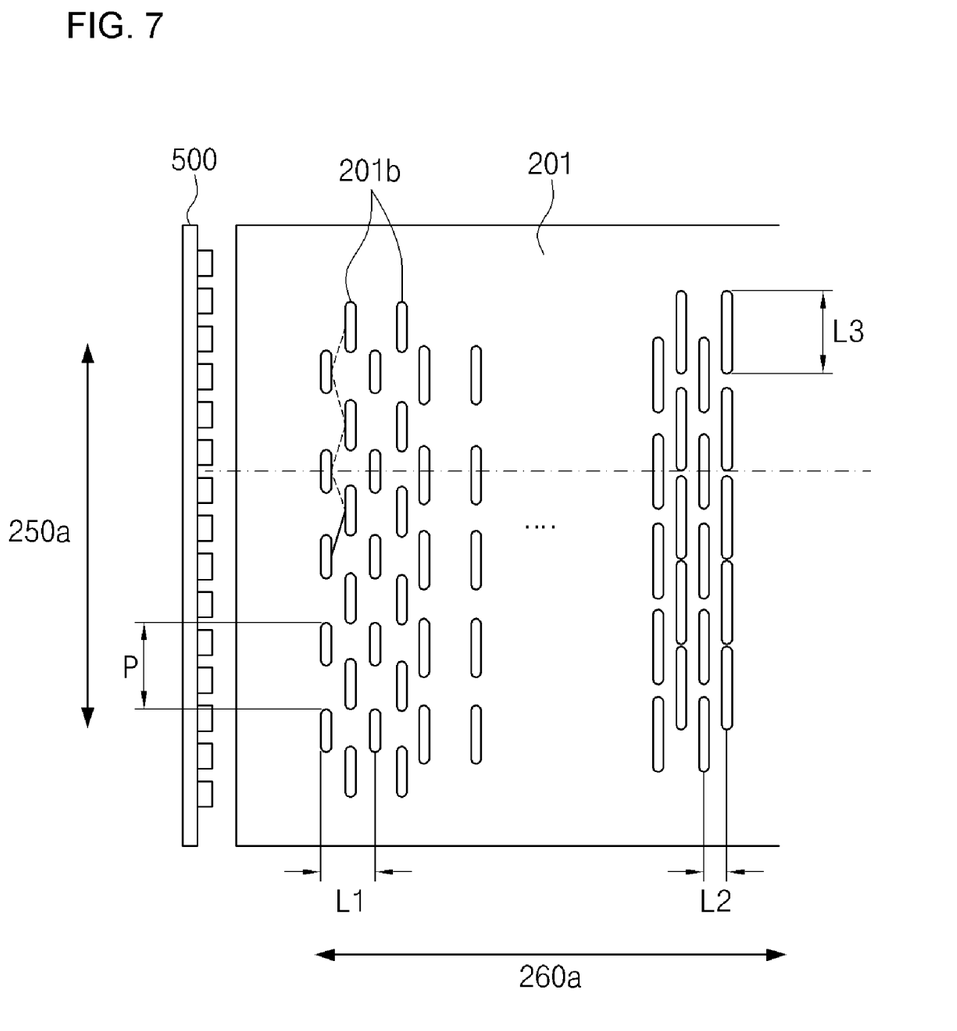
FIG. 7 is a diagram illustrating a shape of a light guide pattern according to another exemplary embodiment of the present invention.
Figure 8:
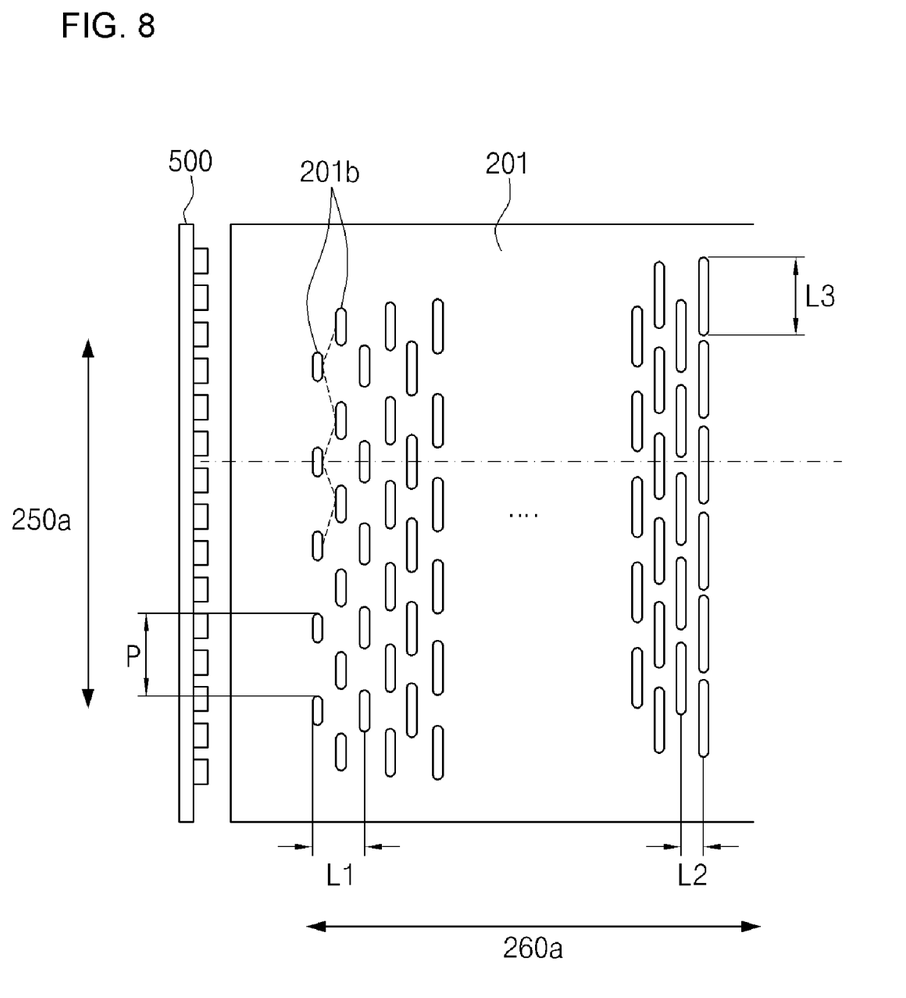
FIG. 8 is a diagram illustrating a shape of a light guide pattern according to a further exemplary embodiment of the present invention.

FIG. 5 is a perspective diagram illustrating a light guide panel and a light guide pattern formed therein according to an exemplary embodiment of the present invention. FIGS. 6 to 8 are diagrams illustrating a shape of a light guide pattern according to various exemplary embodiments of the present invention.

In FIGS. 5 to 8, reference numeral 'L1' denotes an interval between grooves of a groove pair constituting a light guide pattern 201a, 'L2' denotes an interval between groove pairs, 'L3' denotes a length of a groove, and 'P' denotes a pitch between grooves. Reference numeral 201b denotes a groove pair simultaneously formed by a multi focus.

FIGS. 5 to 8 illustrate only a dotted line shape consisting of discontinuous grooves of predetermined depths as a shape of a groove constituting the light guide pattern 201a, but it may be either a dot shape of a predetermined depth or a straight line shape consisting of continuous grooves. Also, in order to increase a rate of light diffusion and scattering, the light guide pattern 201a can gradually increase the length (L3) of the groove or can gradually decrease the pitch (P) between the grooves as it is distant from a light source 500.

Also, in case that the laser beam is split into two, the light guide pattern 201a is formed with two grooves being paired. In case that the laser beam is split into three, the light guide pattern 201a is formed with three grooves being grouped. At this time, the interval (L2) between the groove pairs is desirably within a range of about 100 μm to 2000 μm. The light guide pattern 201a is formed over a region of the light guide panel 201 in order to effectively diffuse and scatter light guided from the light source 500 to the light guide panel 201.

The shape of the light guide pattern manufactured by the pattern forming apparatus is described below with reference to FIGS. 6 to 8.

Referring to FIG. 6, a length (L3) of a groove of the light guide pattern 201a close to the light source 500 is relatively shorter than a length (L3) of a groove of the light guide pattern 201a distant from the light source 500. Also, as illustrated in FIG. 6, a pitch (P) between grooves of the light guide pattern 201a close to the light source 500 can be identical with a pitch (P) between grooves of the light guide pattern 201a most distant from the light source 500 but, according to an exemplary embodiment, the pitch (P) between the grooves of the light guide pattern 201a close to the light source 500 can be made longer. Also, although not illustrated in FIG. 6, the pitches (P) between the grooves may be formed to be different from each other depending on the arrangement direction of the light source 500. Also, as illustrated in FIG. 6, a phase of the groove pair 201b consisting of two grooves may be identical.

On the other hand, as illustrated in FIG. 6, the intervals (L2) between the groove pairs 201b are identical with each other throughout the light guide panel 201. Also, according to an exemplary embodiment, the interval (L1) between the grooves of the groove pair can be made identical with the interval (L2) between the groove pairs 201b. If the 'L1' becomes equal to the 'L2', an appearance quality when the groove pair 201b is seen with naked eyes can be enhanced.

Also, as illustrated in FIG. 6, an incidence light can be equally incident on the light guide pattern 201a by alternately arranging one groove pair and a next groove pair of a vertical direction to the arrangement direction of the light source 500.

Also, as illustrated in FIG. 7, it is possible to arrange a region of one groove pair 201b and a region of a next groove pair 201b of a vertical direction to the arrangement direction of a light source 500 such that they can be partially overlapped with each other. In detail, it is possible that, after a first groove of an $X^{th}$ groove pair is arranged, a first groove of an $(X+1)^{th}$ groove pair is arranged and then a second groove of the $X^{th}$ groove pair is arranged. Because of a structural characteristic in which one groove pair 201b has the same shape, in case that an output of a laser beam is varied depending on time, the whole shape of a light guide pattern 201a can be seen non-uniform. Thus, appearance quality can be enhanced by alternately arranging as above.

By this method, although it is distant from the light source 500 installed at one sidewall of a light guide panel 201, the light guide pattern 201a of a discontinuous straight line shape gradually becomes longer, thus being capable of increasing an amount of guided light and, due to this, being capable of preventing a decrease of luminance resulting from getting distant from the light source 500. Also, uniform luminance can be obtained throughout the light guide panel 201.

FIG. 8 is a diagram illustrating a shape of a light guide pattern formed by a pattern forming apparatus capable of separately controlling a plurality of laser oscillating units like the pattern forming apparatus of FIG. 4.

Referring to FIG. 8, a light guide pattern 201a is formed in one surface of a light guide panel 201 according to a constant design rule based on a relative position relation with a light source 500.

In detail, a light source 500 is installed at one sidewall of the light guide panel 201. The light guide pattern 201a is of a shape of a discontinuous dotted line of a plurality of groove pairs 201b. The groove pairs 201b are distant from each other as much as a constant interval (L2). A plurality of grooves are discontinuously formed along a length direction of the light source 500 as each having a shorter length (L3) in the periphery of the light guide panel 201 close to the light source 500 than in other regions of the light guide panel 201.

On the contrary, grooves are each formed to have a longer length (L3) as it is distant from the light source 500 than in a region of the light guide panel 201 close to the light source 500.

At this time, grooves of each groove pair 201b can have a different length (L3) because one dotted line and the other dotted line are processed by a different laser output.

Also, a pitch (P) between grooves in the periphery of the light guide panel 201 close to the light source 500 can be substantially more than or equal to a pitch (P) between grooves of the light guide panel 201 most distant from the light source 500. However, the pitch (P) between the grooves may be varied depending on a position of the length direction of the light source 500.

On the other hand, an interval (L1) between grooves and an interval (L2) between groove pairs are each identically maintained throughout the light guide pattern 201a. Also, the interval (L1) between the grooves may be the same as the interval (L2) between the groove pairs.

Also, one groove pair and a next groove pair of a vertical direction to the arrangement direction of the light source 500 are alternately installed such that an incidence light from the light source 500 can be equally incident on the light guide pattern 201a.

Thus, although it is distant from the light source 500, the grooves of the light guide pattern 201a get denser, thus being capable of increasing an amount of guided light and preventing a decrease of luminance. Undoubtedly, each of the grooves constituting the light guide pattern 201a is processed by the above pattern forming apparatus.

The aforementioned shape of the light guide pattern 201a does not intend to limit the scope of the invention, and any shape is, if capable of reflecting light from the light source 500 to the front and diffusing and scattering the light, possible. Also, in the aforementioned exemplary embodiment, a scattering characteristic of a guided light can be controlled, thus obtaining a uniform luminance, by keeping the intervals (L1) between the grooves identical with each other in the light guide pattern 201 but mixingly varying the length (L3) of each groove or the interval (L2) between the groove pairs or the pitch (P) between the grooves as it is distant from the light source 500.

As described above, the present invention can split one laser beam into a plurality of laser beams and reflect and concentrate each of the split laser beams and create a plurality of light guide patterns at a time, thus improving the productivity of the light guide patterns.

Also, the present invention has an advantage of creating a plurality of light guide patterns at a time and simultaneously controlling lengths of the light guide patterns by line, by employing a plurality of laser oscillating units and independently controlling each of the plurality of laser oscillating units.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for forming a pattern, the apparatus comprising:
   a pattern storing unit for storing data on a light guide pattern to be formed in a light guide panel;
   a controller for reading out the data on the light guide pattern stored in the pattern storing unit, and transmitting a position signal of each light guide pattern to be formed in the light guide panel to an X-Y driver and simultaneously, transmitting a switching signal, which is generated on the basis of length information of the light guide pattern, to a laser oscillating unit;
   the laser oscillating unit for outputting a laser beam synchronized with a movement of a header unit, on the basis of the position signal received from the controller;
   the X-Y driver for moving the header unit and a stage, on the basis of the position signal received from the controller;
   the header unit moving along a fixed first guide rail in the left and right direction of the light guide panel by way of the X-Y driver, and forming the light guide pattern in the light guide panel by vertically downwardly reflecting and concentrating the laser beam output from the laser oscillating unit; and
   the stage moving along a fixed second guide rail in the front and rear direction of the light guide panel by way of the X-Y driver, and safely mounting the light guide panel thereon,
   wherein the header unit comprises a beam splitter for splitting the laser beam being output from the laser oscillating unit up two or more laser beams, and an optic unit for reflecting and concentrating each of the two or more laser beams split in the beam splitter, and
   wherein the two or more laser beams simultaneously output from the optic unit are each concentrated to a multi focus at a distance on the whole processing surface of the light guide panel.

2. An apparatus for forming a pattern, the apparatus comprising:
   a pattern storing unit for storing data on a light guide pattern to be formed in a light guide panel;
   a controller for reading out the data on the light guide pattern stored in the pattern storing unit, and transmitting a position signal of each light guide pattern to be formed in the light guide panel to an X-Y driver and simultaneously, transmitting a plurality of switching signals, which are generated on the basis of length information of the light guide pattern;
   a plurality of laser oscillating units being each independently controlled on the basis of the plurality of switching signals received from the controller, and outputting a laser beam synchronized with a movement of the header unit;
   the X-Y driver for moving the header unit and a stage, on the basis of the position signal received from the controller;
   the header unit moving along a fixed first guide rail in the left and right direction of the light guide panel by way of the X-Y driver, and forming the light guide pattern in the light guide panel by vertically downwardly reflecting and concentrating each of the laser beams output from the plurality of laser oscillating units; and
   the stage moving along a fixed second guide rail in the front and rear direction of the light guide panel by way of the X-Y driver, and safely mounting the light guide panel thereon,
   wherein the plurality of laser beams simultaneously output from the laser oscillating unit are each concentrated to a multi focus at a distance on the whole processing surface of the light guide panel.

3. The apparatus of claim 1, wherein the light guide pattern formed in the light guide panel is comprised of grooves of a dot pair or group comprised of two or more dots, a dotted line pair or group comprised of two or more dotted lines, or a straight line pair or group comprised of two or more straight lines.

4. The apparatus of claim 1, further comprising a vacuum unit installed on a bottom surface of the light guide panel in order to prevent the light guide panel from being bent due to local heating of the laser beam.

5. The apparatus of claim 1, further comprising an exhaust unit installed on a top surface of the light guide panel in order to eliminate smoke generated while the light guide pattern is formed in the light guide panel.

6. The apparatus of claim 3, wherein the light guide pattern is formed such that a length (L3) of each groove of the light guide pattern gradually gets longer as it is distant from a light source.

7. The apparatus of claim 3, wherein the light guide pattern is formed such that a pitch (P) of each groove of the light guide pattern gradually gets narrower as it is distant from a light source.

8. The apparatus of claim 3, wherein the light guide pattern is formed throughout the light guide panel such that an interval (L1) between grooves is identical with an interval (L2) between groove pairs, or only the intervals (L1) between the grooves are identical with each other, or only the intervals (L2) between the groove pairs are identical with each other.

9. The apparatus of claim 3, wherein the light guide pattern is formed such that one groove pair and a groove pair of a next line are alternated.

10. The apparatus of claim 3, wherein the light guide pattern is formed such that a plurality of lines each comprised of groove pairs are arranged horizontally with the arrangement direction of a light source, and a region of groove pairs of one line is partially overlapped with a region of groove pairs of a next line.

11. The apparatus of claim 2, wherein the light guide pattern formed in the light guide panel is comprised of grooves of a dot pair or group comprised of two or more dots, a dotted line pair or group comprised of two or more dotted lines, or a straight line pair or group comprised of two or more straight lines.

12. The apparatus of claim 2, further comprising a vacuum unit installed on a bottom surface of the light guide panel in order to prevent the light guide panel from being bent due to local heating of the laser beam.

13. The apparatus of claim 2, further comprising an exhaust unit installed on a top surface of the light guide panel in order to eliminate smoke generated while the light guide pattern is formed in the light guide panel.

14. The apparatus of claim 11, wherein the light guide pattern is formed such that a length (L3) of each groove of the light guide pattern gradually gets longer as it is distant from a light source.

15. The apparatus of claim 11, wherein the light guide pattern is formed such that a pitch (P) of each groove of the light guide pattern gradually gets narrower as it is distant from a light source.

16. The apparatus of claim 11, wherein the light guide pattern is formed throughout the light guide panel such that an interval (L1) between grooves is identical with an interval (L2) between groove pairs, or only the intervals (L1) between the grooves are identical with each other, or only the intervals (L2) between the groove pairs are identical with each other.

17. The apparatus of claim 11, wherein the light guide pattern is formed such that one groove pair and a groove pair of a next line are alternated.

18. The apparatus of claim 11, wherein the light guide pattern is formed such that a plurality of lines each comprised of groove pairs are arranged horizontally with the arrangement direction of a light source, and a region of groove pairs of one line is partially overlapped with a region of groove pairs of a next line.

* * * * *